United States Patent [19]
Hollinger, Jr.

[11] Patent Number: 5,714,120
[45] Date of Patent: *Feb. 3, 1998

[54] METHOD FOR PRESERVING AN ARCHIVAL DOCUMENT OR OBJECT

[75] Inventor: William K. Hollinger, Jr., McLean, Va.

[73] Assignee: Conversation Resources International, Inc., Springfield, Va.

[*] Notice: The term of this patent shall not extend beyond the expiration date of Pat. No. 5,693,384.

[21] Appl. No.: 465,310

[22] Filed: Jun. 5, 1995

Related U.S. Application Data

[62] Division of Ser. No. 860,078, Mar. 30, 1992, Pat. No. 5,633,054.

[51] Int. Cl.⁶ .................................................. B65D 65/38
[52] U.S. Cl. ........................ 422/40; 428/34.2; 428/323; 428/537.5; 206/524.2
[58] Field of Search .................. 422/1, 4, 40; 162/181.1, 162/181.2; 206/214, 215, 425, 524.2; 428/34.2, 481, 535, 536, 323, 537.5

[56] References Cited

U.S. PATENT DOCUMENTS

| | | | |
|---|---|---|---|
| 827,863 | 8/1906 | Greenstreet | 426/133 |
| 1,019,589 | 5/1912 | Beadell | 312/31 |
| 1,042,801 | 10/1912 | Kitsee | 312/31 |
| 1,121,919 | 12/1914 | Griffrey et al. | 206/205 |
| 1,234,945 | 7/1917 | Rupert | 206/205 |
| 1,346,349 | 7/1920 | Tate | 252/190 |
| 1,595,416 | 8/1926 | Rafsky | 162/181.2 |
| 1,598,104 | 8/1926 | Rafsky | 162/181.2 |
| 1,614,753 | 1/1927 | Moyer | 252/194 |
| 1,726,573 | 9/1929 | Lang | 312/31 |
| 1,740,351 | 12/1929 | Isobe | 252/194 |
| 1,741,921 | 12/1929 | Davenport | 252/194 |
| 1,914,526 | 6/1933 | Rafton | 162/127 |
| 1,918,109 | 7/1933 | Joyce | 206/403 |
| 1,976,744 | 10/1934 | Rafton | 162/181.2 |
| 2,060,824 | 11/1936 | Rafton | 162/128 |
| 2,080,066 | 5/1937 | Sheppard et al. | 312/31 |
| 2,178,606 | 11/1939 | Plumstead | 162/181.2 |
| 2,202,742 | 5/1940 | McCorkhill | 96/153 |
| 2,242,087 | 5/1941 | Plumstead | 162/181.2 |
| 2,278,295 | 3/1942 | Wilson | 312/31 |
| 2,933,455 | 4/1960 | Doying | 252/194 |
| 2,985,553 | 5/1961 | Anderson | 428/186 |
| 3,326,810 | 6/1967 | Dolan | 252/194 |
| 3,567,645 | 3/1971 | Dultz | 252/194 |
| 3,592,674 | 7/1971 | Maskal et al. | 106/464 |

(List continued on next page.)

FOREIGN PATENT DOCUMENTS

| | | |
|---|---|---|
| 115586 A1 | 8/1984 | European Pat. Off. . |
| 678636 | 10/1991 | Switzerland . |
| 1007981 | 10/1965 | United Kingdom . |
| 2208397 | 3/1989 | United Kingdom . |
| 91/14496 | 10/1991 | WIPO . |

OTHER PUBLICATIONS

Parks, et al. "Studies on the Degradation Products of Paper With and Without Pollutants in a Closed Enviroment", NISTIR 4456, Dec. 1990.
EPO Search Report, EP 93 10 5154, Aug. 18, 1993.
Patent Abstracts of Japan, vol. 016197, publication No. JP4029232, abstract publication dated May 12, 1992.
Tulsi Ram. "Molecular Sieves: Antidote to Vinegar Syndrome", AMIA Newsletter, No. 19, Mar. 1933.
A. Tulsi Ram, et al., "The Effects and Prevention of the 'Vinegar Syndrome'" Eastman Kodak Co., presented in part at the NAPM/AnSi IT9–2 Color sumcomm. on Nov. 17, 1992 and at the AMIA conference in San Francisco, CA on Dec. 10, 1992.
"Beyond Zeolites: Mesoporous materials" Science News, 143:44 (1993).

*Primary Examiner*—Robert J. Warden
*Assistant Examiner*—E. Leigh Dawson
*Attorney, Agent, or Firm*—Finnegan, Henderson Farabow, Garrett & Dunner, L.L.P.

[57] ABSTRACT

A material containing an alkaline buffer or deacidifying agent and an adsorbent, and a method for preserving an archival document or object using the material.

5 Claims, 3 Drawing Sheets

U.S. PATENT DOCUMENTS

| | | | |
|---|---|---|---|
| 3,597,251 | 8/1971 | Kaufman | 106/427 |
| 3,607,777 | 9/1971 | Winyall et al. | 423/338 |
| 3,671,310 | 6/1972 | Brown et al. | 428/535 |
| 3,770,577 | 11/1973 | Humphrey | 162/159 |
| 3,870,596 | 3/1975 | Asadea et al. | 162/157.7 |
| 3,898,356 | 8/1975 | Williams et al. | 427/343 |
| 4,036,360 | 7/1977 | Deffeyes | 206/204 |
| 4,093,105 | 6/1978 | Russell et al. | 220/373 |
| 4,153,505 | 5/1979 | Ferguson | 162/164.6 |
| 4,154,363 | 5/1979 | Barthel | 220/421 |
| 4,207,366 | 6/1980 | Tyler | 428/73 |
| 4,240,870 | 12/1980 | Shibazaki et al. | 162/181.2 |
| 4,259,092 | 3/1981 | Matsuo et al. | 96/125 X |
| 4,263,094 | 4/1981 | Login et al. | 162/164.7 |
| 4,283,450 | 8/1981 | Luck et al. | 428/171 |
| 4,441,953 | 4/1984 | Hollinger, Jr. | 156/290 |
| 4,489,112 | 12/1984 | Wise et al. | 428/34.2 |
| 4,489,120 | 12/1984 | Hollinger, Jr. | 428/182 |
| 4,606,503 | 8/1986 | Bleeck | 241/16 |
| 4,606,790 | 8/1986 | Youngs et al. | 162/125 |
| 4,610,801 | 9/1986 | Matthews et al. | 252/181 |
| 4,636,392 | 1/1987 | Toshitsugu | 426/110 |
| 4,685,563 | 8/1987 | Cohen et al. | 206/721 |
| 4,711,702 | 12/1987 | Hood | 162/123 |
| 4,753,832 | 6/1988 | Brown et al. | 428/34.2 |
| 4,769,274 | 9/1988 | Tellvik et al. | 428/218 |
| 4,798,290 | 1/1989 | Bradford | 206/721 |
| 4,806,398 | 2/1989 | Martin, Jr. | 428/34.2 |
| 4,835,025 | 5/1989 | Thompson et al. | 428/34.2 |
| 4,846,855 | 7/1989 | Tsujimoto | 55/60 |
| 4,861,632 | 8/1989 | Caggiano | 428/35.2 |
| 4,921,733 | 5/1990 | Gibbons et al. | 428/34.2 |
| 4,927,705 | 5/1990 | Syme et al. | 428/282 |
| 4,930,550 | 6/1990 | Czerwinski et al. | 137/334 |
| 4,940,612 | 7/1990 | Gibbons et al. | 428/34.2 |
| 5,008,137 | 4/1991 | Nugent, Jr. et al. | 428/35.4 |
| 5,048,262 | 9/1991 | Kakuda | 53/401 |
| 5,055,161 | 10/1991 | Hoffman | 162/125 |
| 5,061,345 | 10/1991 | Hoffman | 162/125 |
| 5,096,539 | 3/1992 | Allan | 162/9 |
| 5,215,192 | 6/1993 | Ram et al. | 206/205 |
| 5,219,524 | 6/1993 | Evan, II | 422/40 |
| 5,260,023 | 11/1993 | Evans, II | 422/40 |

METHOD FOR PRESERVING AN ARCHIVAL DOCUMENT OR OBJECT

This is a divisional application of Ser. No. 07/860,078, filed Mar. 30, 1992, now U.S. Pat. No. 5,633,054.

FIELD OF THE INVENTION

This invention relates to archival materials and the preservation of archival materials such as documents or other objects. More specifically, it relates to packaging and other articles of manufacture which can be used to assist in the preservation of archival documents and objects.

BACKGROUND OF THE INVENTION

Many attempts have been made to protect container contents from the deleterious effects of both outside elements and from residual chemicals within the container material itself.

Schoettle, U.S. Pat. No. 1,773,064, discloses a cardboard container wherein the inner layer of cardboard is coated with an acid in order to protect the contents of the container from alkaline fumes emitted from the adhesive used in container construction and/or sealing.

Palmer et al., U.S. Pat. No. 1,564,707, and Flynn, U.S. Pat. No. 2,144,453, both relate to packages specifically designed for photographic film. In the foyer, the wrapping comprising the container is substantially free from sulphur, ammonia, and turpentine. In the latter, there is a black, opaque outer layer and an inner layer which is described only as "inert towards light-sensitive, photographic emulsions".

Hutter, U.S. Pat. No. 2,534,201 discloses a container having metal corrosion inhibiting characteristics. This is achieved through the use of an inner layer comprised of both an organic amide and an inorganic metal nitrate.

Fox et al., U.S. Pat. No. 2,555,031, discloses a container for storing phosphatic fertilizers for extended periods by coating the inner layer of the container with a lime material.

Hollinger, U.S. Pat. No. 4,489,120, discloses a boxboard comprising a first layer of paperboard consisting of non-buffered, substantially pure alpha-cellulose and an alkaline size, a second layer of a paperboard comprising alpha-cellulose, an alkaline buffer and an alkaline size and, intermediate said first and second layers, a layer of water-impermeable plastic. Hollinger states that the inner layer is non-buffered in order to avoid damage to the contents of containers made from the boxboard.

A study by Parks et al. entitled "Studies on the Degradation Products of Paper with and without Pollutants in a Closed Environment: I. Preliminary Results", issued in 1990 by the National Institute of Standards & Technology (NIST), states that for papers aged in the presence of $SO_2$, "High performance liquid chromatography (HPLC) on aqueous extracts showed eight peaks from the newsprint aged with $SO_2$ and six peaks in the absence of $SO_2$. Of the eight components found in newsprint aged in $SO_2$, six were tentatively identified as 2-ketoglutaric acid, malic acid, malonic acid, succinic acid, formic acid, and acetic acid. In the absence of $SO_2$, four acids were tentatively identified (malonic, succinic, formic and acetic acids)." The study tentatively identified two acids in a rag paper as malonic and succinic acid. The components included: 2-ketoglutaric acid [$HOOCCO(CH_2)_2$ COOH], malic acid, malonic acid [$CH_2(COOH)_2$], succinic acid [$(CH_2)_2(COOH)_2$], formic acid (HCOOH), and acetic acid ($CH_3$ COOH).

The study shows the existence of problems related to $SO_2$ and other pollutants in archival containers. Also, in Table 1 on page 16 of the NIST study, the data shows that newsprint aged in air has a folding endurance of 4.9 double folds at a 600 gm load, and only 1.9 folds when aged with $SO_2$ in the air. Similarly, the rag paper aged in air survived 34 double folds at a 1000 gm load, while the rag paper aged in $SO_2$ and air survived only 10.5 folds at this load.

The NIST paper also states that "Sulfur dioxide absorbed into paper from the atmosphere is a suspected precursor of in situ hydrolysis through the formation of sulfurous acid, sulfuric or possible analogues with anhydrocellulose units." It is known that oxides of nitrogen combine with moisture to form nitric acid, and that these pollutants and others attack other artifacts such as photographs. Sulfur compounds cause silver images, e.g. in photographs or microfilm and microfiche, to fade as the metallic silver is converted to silver sulfide. Acids attack all of the components of the photograph; they can bleach the silver image, causing evident fading, and they can attack the paper and gelatin support, which can become brittle. Peroxides in concentrations as low as one part in thirty million can cause image oxidation and fading.

Other by-products of deterioration found by other researchers include low molecular weight ketones, aldehydes and phenols. The NIST researchers also discuss problems associated with trapped by-products of deterioration, stating that "Degradation products with significant vapor pressure at room temperature are kept in by the sealing of the papers in a container. The diffusion of these degradation products can occur in a variety of ways. They may become air borne and attach themselves to another paper or another site on the same paper encouraging degradation there."

In the area of archival preservation, i.e., the preservation of papers, photographs, textiles and artifacts of historical, aesthetic or sentimental significance, containers have historically been fabricated from papers developed for the long-term preservation of paper documents. However, it has been discovered that stored archival materials produce various by-products of deterioration which accelerate the deterioration process. Moreover, various harmful pollutants, such as sulfur dioxide, are readily able to pass through conventional archival boxboards, and their entry is not prevented by alkaline materials contained in such boxboards. Even though the archival paper may absorb such pollutants, it will later release them and permit them to react with the artifacts contained therein.

Further, it has been observed that the actual configuration of the container may also contribute to the deterioration process. Generally, if the container utilizes for the long term storage of archival documents is only partially filled, the archival documents stored inside will have a tendency to slide down across the bottom of the container and assume a curved shape. Over a period of time, this results in permanent deformation of the documents in a curved condition which makes them subject to cracking when removed, thus accelerating the deterioration process. In the past, attempts to prevent this curved condition have included stuffing crumpled paper in the open space of the container to maintain the documents in a flat condition and prevent them from sliding down and curving.

Accordingly, it is an object of the present invention to provide a container made from paper which does not contain substances that will deteriorate and release compounds which will be harmful to archival materials stored therein. It is a further object of the present invention to provide a durable container which will substantially diminish problems associated with accelerated deterioration of archival materials produced by the deterioration by-products of such materials. An additional object of the present invention is to provide a container which will permit the long term storage of documents without slippage of the documents or the resulting deformation. Other objects of the present invention will become apparent from the following description and the practice of the invention.

SUMMARY OF THE INVENTION

The objects of one aspect of the present invention are achieved by providing a layered material for the preservation of archival documents and objects which comprises a buffered second layer, a buffered first layer and a vapor barrier positioned between the first layer and the second layer.

Preferably, the first and/or second layers are buffered with calcium carbonate, magnesium bicarbonate or a mixture thereof. Preferably, the vapor barrier comprises a layer of polyester, and the polyester is preferably metallized. Preferably, the first layer further comprises an adsorbent such as activated carbon. Preferably, the first layer comprises at least 10% by weight of the adsorbent based on the total weight of the first layer. More preferably, the layer contains at least 20% by weight of the adsorbent. Preferably, the first layer comprises an amount of a buffering agent which ranges from 2 to 5% by weight based on the total weight of the first layer. More preferably, the amount of buffering agent ranges from 3 to 4% by weight.

Preferably, the second layer has a smooth and durable finish, and comprises fibers of northern softwoods. The material can further comprise a porous layer, wherein the first layer is positioned between the porous layer and the vapor barrier. Preferably, the porous layer is substantially free of the adsorbent, in order to avoid contact between, e.g., activated carbon and the archival documents or objects stored therein. Preferably, the porous layer contains a buffer and comprises a high quality fiber such as cotton, northern softwood or eucalyptus fibers. The porous layer is preferably free from lignin and sulfur. The porous layer can also comprise an adsorbent such as activated carbon. Both the first and second layer preferably have a neutral to alkaline pH, preferably ranging from 8.5 to 9.2.

The objects of another aspect of the present invention are achieved by providing an article of manufacture such as an archival document or other object, or a container for storing the archival documents or objects, in which the article comprises a buffer and an adsorbent. The following preferred variants of this aspect of the invention relate to both the container and the article.

The buffer and the adsorbent may be interspersed in a single layer of the article, or the buffer and the adsorbent can instead be contained in two or more distinct layers. Preferably, the article is substantially free from lignin and sulphur. Preferably, the article is buffered with calcium carbonate, magnesium bicarbonate or a mixture thereof, and is sealed with a vapor barrier, which comprises a layer of polyester or metallized polyester. Preferably, the adsorbent is activated carbon, and the article comprises the adsorbent in an amount which is at least 10% by weight based on the total weight of a layer in which the adsorbent is contained. More preferably, the inner layer comprises the adsorbent in an amount which is least 20% by weight based on the total weight of a layer in which the adsorbent is contained.

Preferably, the article comprises an amount of a buffering agent which ranges from 2 to 5% by weight based on the total weight a layer in which the buffering agent is contained. More preferably, the amount of buffering agent ranges from 3 to 4% by weight.

The objects of another aspect of the present invention are achieved by providing a method of preserving an archival document or object, comprising storing the archival document or object in proximity to a mixture containing a buffer and an adsorbent. The buffer and the adsorbent can be an integral portion of a container in which the archival document or object is stored. Alternatively, the buffer, the adsorbent or a mixture comprising the buffer and the adsorbent can be stored within a container, and the archival document or object can also be stored within the container.

The objects of another aspect of the present invention are achieved by providing an article such as artist's paper or canvas having a surface suitable for drawing or painting. The artist's paper may further comprise a vapor barrier, which may be located either within the artist's paper or on a side of the artist's paper opposite the surface. The vapor barrier would prevent harmful gases from affecting the matted and framed art.

The objects of yet another aspect of the present invention are achieved by providing a container with a removable divider plate for selectively determining a dimension of the available storage space to prevent the documents in the container from curling or bowing when the container is less than full of documents. The container preferably includes a box-shaped receptacle having a bottom, a front wall, a back wall, and an opposing pair of side walls. An opposing pair of internal walls are positioned within the box-shaped receptacle generally parallel to and spaced from the pair of side walls, and at least one opposing pair of substantially-vertical slots are formed within the pair of internal walls. The container further includes at least one divider plate having an opposing pair of tabs extending substantially perpendicularly from its opposing ends, wherein each tab is adapted to be received by a corresponding slot and positioned substantially parallel to and between a corresponding internal wall and side wall.

Preferably, the box-shaped receptacle and opposing pair of internal walls are integrally formed from a single sheet blank of a material which will not harm the archival documents to be stored inside. It is also preferred that the container includes a cover hingedly attached to the back wall to substantially seal the archival documents stored therein.

BRIEF DESCRIPTION OF THE DRAWINGS

The accompanying drawings, which are incorporated in and constitute a part of the specification, further illustrate the invention and, together with the description, serve to explain the principles of the invention.

DESCRIPTION OF THE PREFERRED EMBODIMENT

Reference will now be made in detail to the present preferred embodiments of the invention. In the example and throughout the specification and claims, all parts and percentages are by weight unless otherwise specified.

Figure 1:
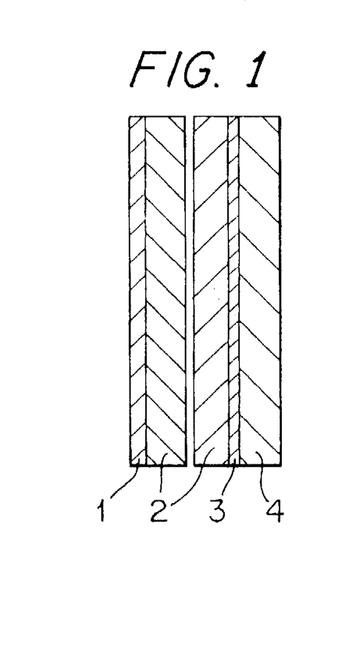
FIG. 1 is a layered material with a buffered inner layer and a vapor barrier.

In accordance with an aspect of the invention, FIG. 1 illustrates a layered material. As here embodied, in FIG. 1, layers 1 and 2 are porous paper formed on a cylinder paper machine. Layer 1 is the outermost layer deposited by the machine cylinder. It forms the inside of an archival box. Layer 1 can contain alkaline buffering or could be a neutral pH, non-buffered layer. It can optionally contain activated charcoal. Preferably, it is highly porous and is made from fibers such as eucalyptus or other fibers having like properties. Layer 2 is deposited on the paper layer by other cylinders and contains activated carbon as an adsorbent and calcium carbonate as a buffer. Layers 1 and 2 form a continuous sheet of paper, and are not separated by an adhesive as they would be in a laminated sheet.

Layer 3 is a barrier layer formed from metallized polyester. It will prevent the passage of vapor through the final product. It is laminated to layers 2 and 4. Layer 4 forms the exterior of a container. It is made from a strong, high density paper having good durability and archival characteristics. It is preferably made in a non-acidic paper system and has an alkaline pH. It contains an alkaline buffering material such as calcium carbonate, and uses a neutral or alkaline (i.e., non-acidic) sizing.

The layered material of FIG. 1 can be formed in varying thicknesses, densities and paper fiber compositions. It can be used for art paper, file folders, envelopes, mats, mounting boards or as a container for storing papers which are to be preserved in their original state for an extended period of time.

Figure 2:
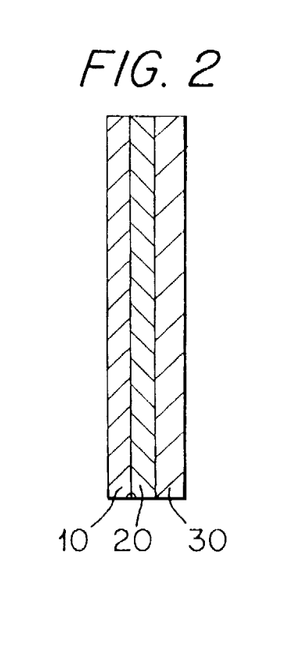
FIG. 2 is a layered material containing a buffer and an adsorbent.

In accordance with an aspect of the invention, FIG. 2 represents a non-laminated multi-layer paper which can be used for interior housings such as envelopes, file folders, interleaving papers, album pages, artist papers, mats, mounting boards and papers, permanent records or other objects where the preservation of the paper in its original state is desired.

In FIG. 2, layer 10 is the interior surface and can be the interior of an envelope, box or file folder. Layer 10 could also be the surface of an artist's paper which would accept the medium in use such as water color, ink, paint or chalk. In that case, FIG. 2 represents a sectional view of an artist's paper.

Layer 10 is preferably made in a non-acid papermaking system and preferably is free of or substantially free of lignin and sulfur. It preferably has a pH in the neutral to alkaline range and contains an alkaline buffer such as calcium carbonate. In some circumstances, it may be desirable for this layer to have a neutral pH and not contain alkaline buffers. Such circumstances would include cases where a protein based material is to be stored in or maintained next to this layer. In other circumstances, it may be desirable to include both an adsorbent such as activated carbon and an alkaline buffer such as calcium carbonate in layer 10. Layer 10 preferably has a high porosity, so that harmful substances can easily pass into and be absorbed by this layer.

Layer 20 is a non-laminated layer. This layer contains an adsorbent such as activated carbon and an alkaline buffer such as calcium carbonate. It is preferably made in a non-acidic papermaking system and is preferably free of or substantially free of lignin and sulfur. It preferably has a pH which ranges from neutral to alkaline.

Layer 30 is an exterior layer of the material. It could form the exterior layer in a housing such as an envelope, box or file folder, or the back of a sheet of paper. If this laminated material were to be used as an artist's paper, layer 30 would represent the side on which the artist would not draw or paint. Layer 30 can contain an adsorbent such as activated carbon and an alkaline buffer such as calcium carbonate. It may also contain alkaline buffer alone. It is preferably made in a non-acidic papermaking system and is preferably free from or substantially free from lignin, sulfur and similar undesirable materials. Layer 30 preferably has a pH in the neutral to alkaline range. If layer 30 is to form the exterior of a housing such as an envelope, box or folder, it preferably has a high density and good durability and surface strength. If this layer is to be colored, non-bleeding permanent colors should be used.

The multilayered structures of FIGS. 1 and 2, as well as other structures within the scope of the present invention, can be made by processes which are substantially similar to those disclosed in U.S. Pat. No. 4,489,120, the disclosure of which is totally incorporated herein by reference. The adsorbent and the buffer can be added to the inner layers of the structure by mixing appropriate amounts of them with the slurry from which the inner layers are to be formed.

In a preferred method, webs are formed by blending fibers that are cut and fibrillated. Fibrillation develops fibrils which can mechanically entrap fillers, pigments or surface active materials, such as buffers and/or adsorbents. The retention produced by this mechanism can be 50% to 60%. When the fiber mat is formed, entanglement of fibers of varying lengths can increase retention to 70% to 80% by fibrillation.

The total retention can be chemically increased to 90% to 98%. Certain chemical combinations such as latex and charged water soluble polymers can produce co-precipitation and agglomeration of polymer surface active fillers and cellulose fibrils. Another possible mechanism involves the electrokinetic attachment of charged water soluble polymers to cellulose fibers. The surface active fillers then attach to the charged polymers. Yet another possible mechanism involves the addition of polymers to form a protective colloid with polymers being attached to the surface active filler. The protective colloid can then attach to fiber surfaces. The surface activity of the protective colloid is not significantly diminished; thus, the surface active fillers or pigment can maintain a high level of activity for absorption of gases of acidic materials that cause deterioration. The polymer combinations may also result in a binding of the surface active filler or pigment, such as activated charcoal and alkaline buffers like calcium carbonate, into the finished, dried fibrous web. The physical and chemical retention mechanisms are usually synergistic, resulting in high retention levels of over 95%. The remaining percentage is lost in the white water of the paper machine.

The adsorbent is preferably selected from activated carbon, activated charcoal, or similar carbon-containing adsorbent materials. It may also be possible to use an inorganic adsorbent such as silica, activated alumina, or a molecular sieve or zeolite. Inorganic adsorbents also adsorb water vapor, and should only be used in situations where this property will not pose a substantial problem.

The buffer is preferably selected from calcium carbonate, magnesium bicarbonate and mixtures thereof. However, other alkali and alkaline earth carbonates, bicarbonates, hydroxides, like compounds and mixtures thereof can also be used. Moreover, the buffer could be incorporated in the various layers by performing a deacidification process for a sufficient length of time such that excess deacidifying agent is introduced into the layers.

Each of the layers described herein (other than the vapor barrier) is preferably made from fully bleached alpha cellulose pulp. The layers are preferably free of lignin, ground wood, waxes, plasticizers, reducible sulphur, oxidizing chemicals and potentially harmful non-cellulose products. The sulphur content is preferably less than 0.0008% reducible sulphur as per ASTMD 984-74 or Tappi 406, su 72. The layers are preferably non-tarnishing as per accelerated tarnishing test ASTMD 2043-69 and Tappi T 444, T 564. The layers are preferably free of particles of metal. Alkaline sizing is preferably used. The surface of the layers is preferably smooth and free from knots, shives and abrasive particles. If it is desired to produce a less expensive product, the layers can contain lignin. They can also be made from recycled paper.

The container preferably shows a maximum fiber loss of one-tenth of one percent after 100 cycles according to Tappi 476. The smoothness is preferably a minimum of 195 Sheffield units following Tappi UM-518 test. The outer portion of the container will preferably withstand a minimum of 1,000 double folds in the weakest direction at 1 kg load after conditioning according to Tappi 511. The outer portion of the container preferably has a minimum Elmsdoff internal tear resistance of 350 gr. per sheet after conditioning according to Tappi T 414. The outer portion of the container preferably has 2800 stiffness units in the machine direction and 1400 stiffness units in the cross direction according to Tappi 489. The bursting strength of the outer portion of the container is preferably at least 300 psi when tested in accordance with Tappi T 807.

When measured according to Tappi T-460-os-68 (the Gurley porosity test), the inner layers preferably will have a Gurley porosity figure of less than 100 sec/100 cc of air, and more preferably of between 5 sec/100 cc and 70 sec/100 cc. The outer layer preferably has a Gurley porosity of between 200 sec/100 cc and 1000 sec/100 cc. The vapor barrier is, of course, not porous, since it is used to prevent pollutants such as $NO_x$, $SO_2$, ozone, peroxides and similar harmful compounds from entering the container.

Figures 5, 6:
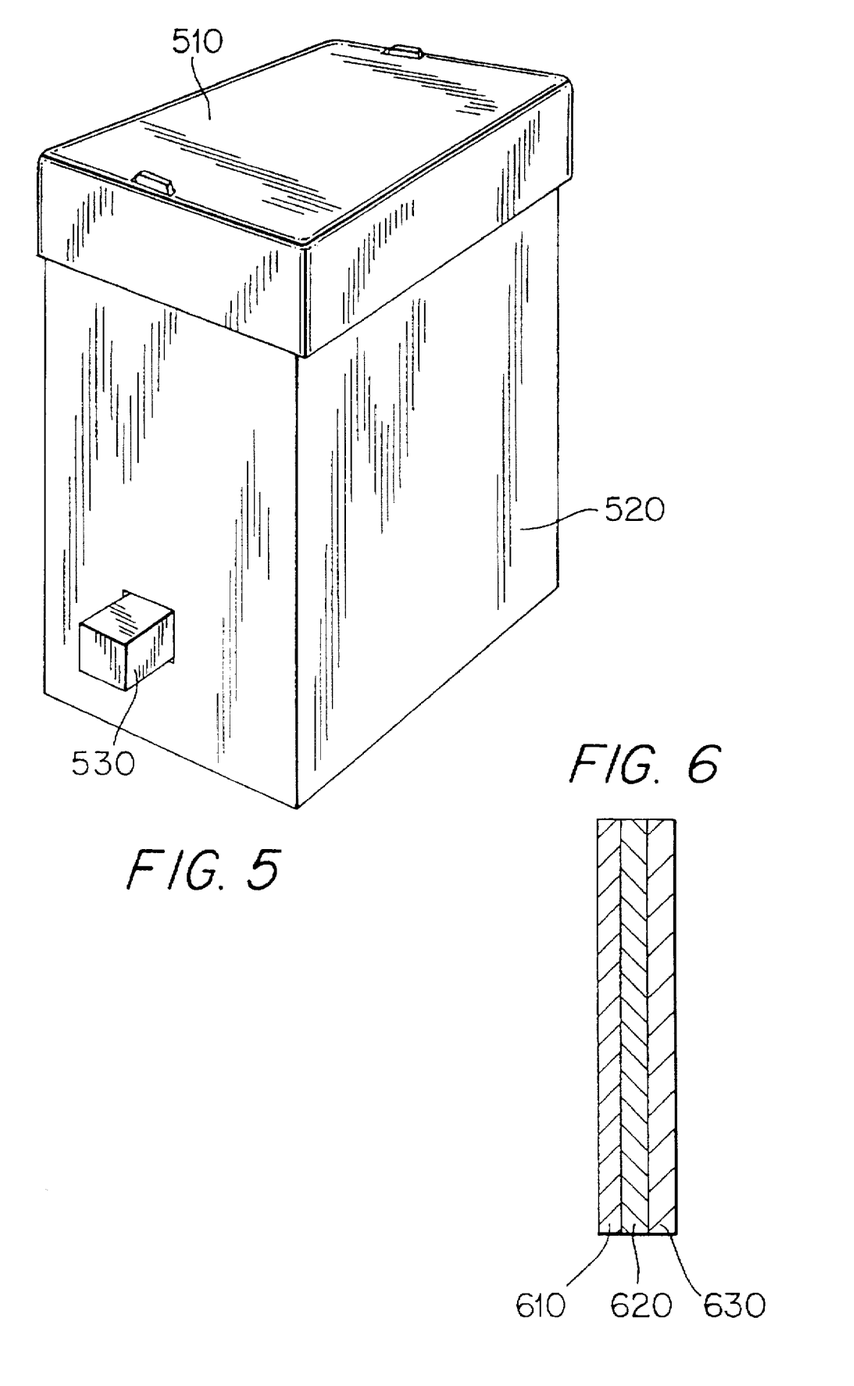
FIG. 5 is an orthographic view of a representative embodiment of a container having a buffer and/or adsorbent contained therein.
FIG. 6 is a side view of a sheet of artist's paper containing a buffer and an adsorbent.

In accordance with another aspect of the invention, FIG. 5 is an orthographic view of a representative embodiment of a container having a buffer and/or adsorbent contained therein. The container preferably has a top 510, a body 520 and may contain a solid object 530 comprising the buffer and/or adsorbent. The buffer and/or adsorbent can in addition or instead be an integral part of the top 510 and/or body 520.

In accordance with another aspect of the invention, FIG. 6 represents a sectional view of an artist's paper. Layer 610 represents the surface of an artist's paper which would accept the medium in use such as water color, ink, paint or chalk.

Layer 620 is a non-laminated layer. This layer contains an adsorbent such as activated carbon and an alkaline buffer such as calcium carbonate. It is preferably made in a non-acidic papermaking system and is preferably free of or substantially free of lignin and sulfur. It preferably has a pH which ranges from neutral to alkaline.

Layer 630 is an exterior layer of the material, and could also represent a side on which the artist would draw or paint, if a two sided artist's paper was desired. Layer 630 can contain an adsorbent such as activated carbon and an alkaline buffer such as calcium carbonate. It may also contain alkaline buffer alone. It is preferably made in a non-acidic papermaking system and is preferably free from or substantially free from lignin, sulfur and similar undesirable materials. Layer 630 preferably has a pH in the neutral to alkaline range. If this layer is to be colored, non-bleeding permanent colors should be used.

In accordance with another aspect of the invention, the container can be configured to permit the long term storage of archival documents without slippage of the archival documents or the resulting deformation.

Figure 3:
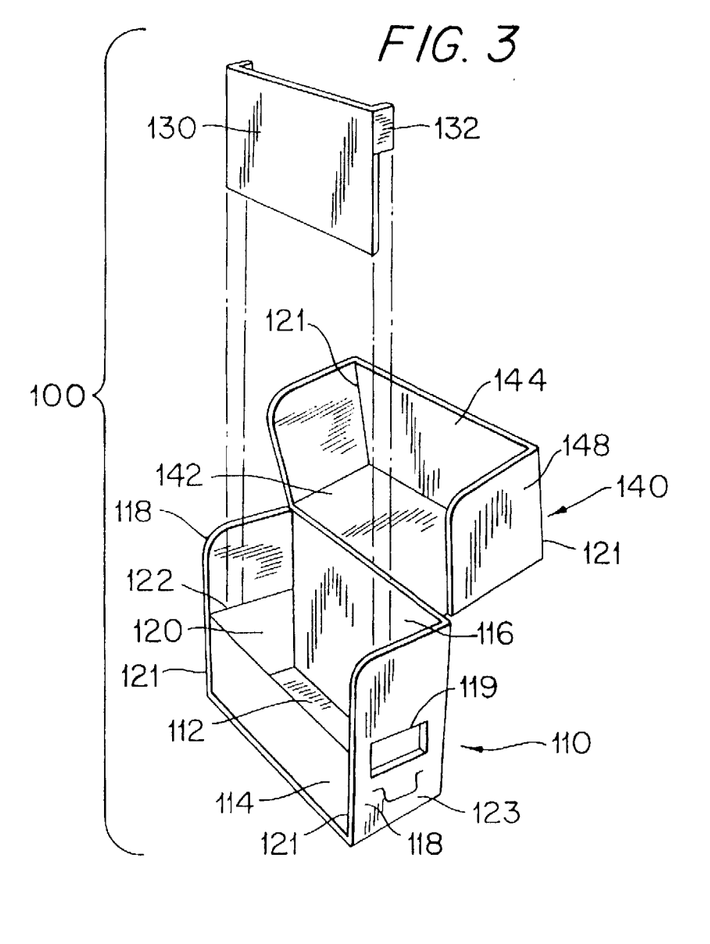
FIG. 3 is an exploded orthographic view of a representative embodiment of the container and removable divider plate.
Figure 4:
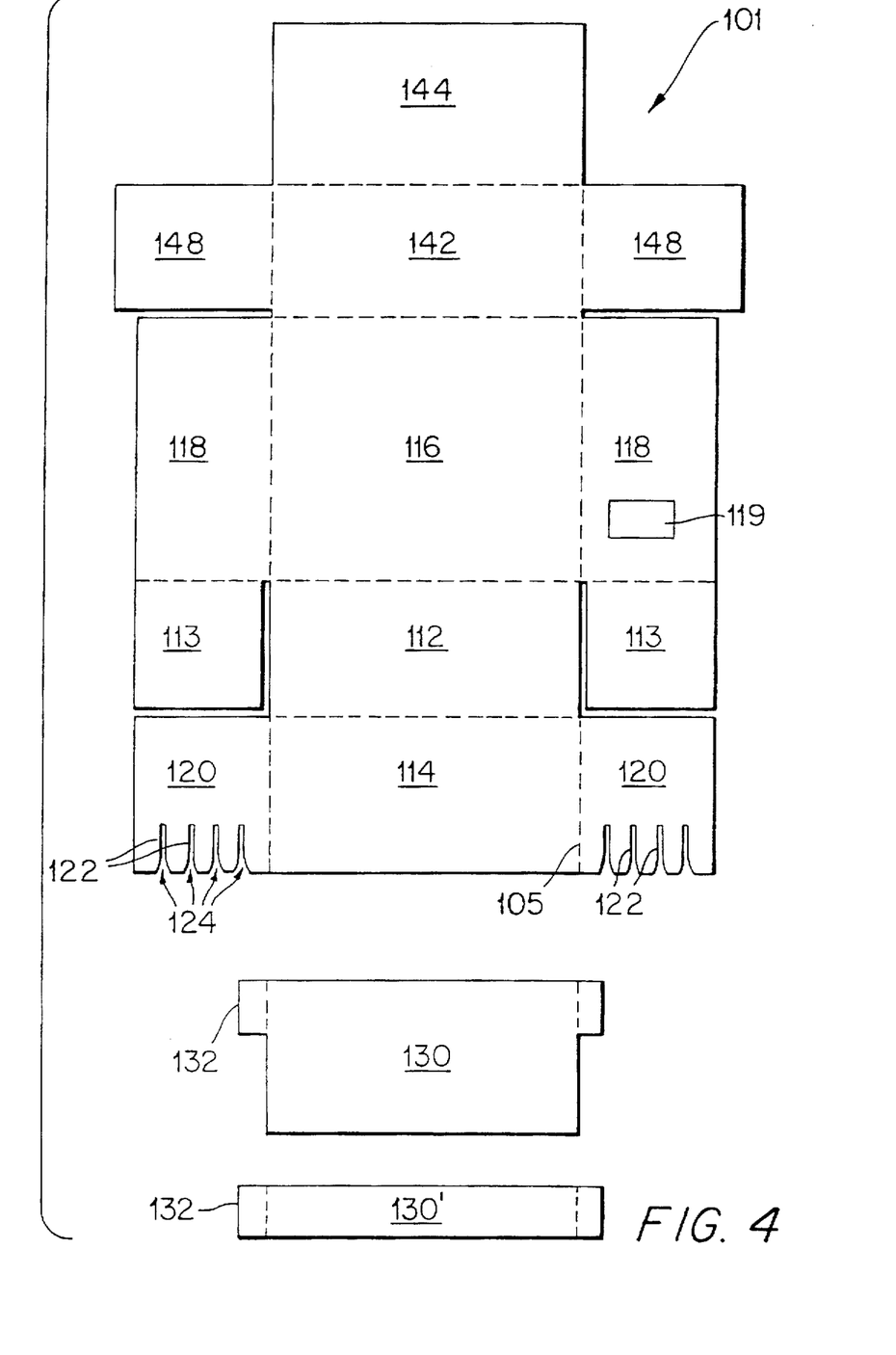
FIG. 4 is a front view of a representative embodiment of a single sheet blank for assembling the container of FIG. 3.

The container is preferably made from archival material, preferably the archival material described in detail above. It preferably includes a box-shaped receptacle having a removable divider plate for selectively determining a dimension of the available storage space. More specifically, and as best seen in FIGS. 3 and 4, the container 100 may include a box-shaped receptacle 110 having a bottom 112, a front wall 114, a back wall 116, and an opposing pair of side walls 118. An opposing pair of internal walls 120 can be positioned within the box-shaped receptacle 110 generally parallel to and spaced from the pair of side walls 118. As seen in FIG. 3, at least one opposing pair of substantially-vertical slots 122 can be formed within the pair of internal walls 120.

The container may further include at least one divider plate 130 having an opposing pair of tabs 132 extending substantially perpendicularly from its opposing ends. Each tab 132 can be adapted to be received by a corresponding slot 122 and positioned substantially parallel to and between a corresponding internal wall 120 and side wall 118, as best seen in FIG. 3. The tabs 132 can face either the front or the back of the container, depending on which side of the container will be more heavily loaded. More specifically, the divider plate 130 is adapted such that the opposing pair of tabs may be slid substantially vertically into engagement with the slots 122 formed in the opposing pair of internal walls 120. As such, it should be evident that by providing a plurality of pairs of slots, selective adjustment of a dimension of available storage space within the container can be greatly enhanced to prevent the documents in the container from curling or bowing when the container is less than full of documents. Further, it is preferable to form the slots 124 with V-shaped entries 124 to facilitate easier insertion of the divider plate 130 within the slots 124.

In the preferred embodiment of the container, the box-shaped receptacle 110 and opposing pair of internal walls 120 are integrally formed from a single sheet blank 101 of the material of the invention set forth above. FIG. 4 presents a representative embodiment of such a single sheet blank 101. As seen in FIG. 4, the single sheet blank is divided by a series of living hinges 105 to form the bottom portion 112, the bottom tabs 113, front wall portion 114, the back wall portion 116, the side wall portion 118, and the internal wall portions 120.

To assemble the container 100, the bottom tab portions 113 are first folded perpendicular to the side wall portions 118, and the internal wall portions 120 are folded perpendicular to the front wall portion 114. The side wall portions 118 are then folded perpendicular to the back wall portion 116, and both the front wall portion 114 and the back wall portion 116 are then folded perpendicular to the bottom portion 112 and substantially parallel with each other. As such, the forward edges of the side wall portions 118 may then be attached to the outer edges of the front wall portion 114, with the internal wall portions 120 extending within the box-shaped receptacle generally parallel to and spaced from the pair of side walls portions 118. Conventional strip staples 121 or other fasteners may be used to attach the walls along their edges. A conventional label opening 119 and a wire handle 123 may also be added. Modifications may be made to the single sheet blank to vary the shape of the box-shaped receptacle, as desired, into other sizes or shapes such as trapezoidal portions for a pyramidal shape.

Similarly, the divider plate 130 and opposing pair of tabs are also preferably formed from the single sheet blank. As seen in FIG. 4, the divider plate may be formed in a variety of shapes, such as a wider divider plate 130 for greater stability or a thinner divider plate 130' for reduced material costs.

As seen in FIG. 3, the container embodied herein also includes a cover 140 hingedly attached to the back wall 116 of the box-shaped receptacle for substantially sealing the archival documents stored therein. FIG. 4 shows that the cover may likewise be integrally formed from the single sheet blank 101 of material described above. The cover 140 includes a cover top portion 142, a cover front wall portion 144, and cover side wall portions 148. As with the box-shaped receptacle 110, the cover 140 is assembled simply by folding the portions along the living hinges 105 and securing the front edges of the cover side wall portions 148 to the outer edges of the cover front wall portion 144.

Preferably, the receptacle 110, the divider plate 130, or both the receptacle 110 and the divider plate 130 comprise a buffer, an adsorbent or a combination thereof. The receptacle 110, the divider plate 130, or both the receptacle 110 and the divider plate 130 may be formed from the article or layered material described above.

EXAMPLE

In this example, the effects of a composition comprising a buffer, an adsorbent or a combination thereof were tested in experiments involving the preservation of alkaline paper samples in an accelerated aging process. In these experiments, individual sheets comprising cellulose fibers and optionally including the adsorbent and/or the buffer were prepared by forming a slurry of a fiber blend and the adsorbent and/or the buffer, and dispersing the slurry in water. The diluted and dispersed slurry was then placed in a sheet mold. This sheet mold had a wire mesh screen at its base. The slurry in the sheet mold was mildly agitated, and the sheet mold was then drained. As the water drained through the wire mesh screen, the fiber and the adsorbent and/or buffer was collected as a mat on the screen. Next, a blotter was placed on the resulting wet fiber mat in order to remove excess water. The blotter was then used to peel the fiber mat away from the wire mesh screen. Next, the mat was sandwiched between two cloth felts and mechanically pressed to remove water. The pressed mat was then dried on a dryer can to form a sheet having a moisture content of between five and ten percent.

Nine paper samples, having the adsorbent and buffer content specified in the following table, were prepared according to the above-noted procedure. The porosity of samples 1-9 was measured by determining the amount of time required to force 100 cc of air through the samples. The results of these measurements are shown in the following table.

Each of these samples was then tested by placing one sheet of the sample in a metallized polyester container, along with five sheets of paper from a book. The book paper had an alkaline pH. After sealing the samples and the book paper inside of the metallized polyester container, the sealed container was aged for 88 hours at a temperature of 100° C.

The book paper was then removed from the polyester container and subjected to various tests. The tensile strength, elongation, resistance to repeated folding under load and the pH of the book papers were measured. The tensile strength of the aged book papers was measured using an Instron pendulum type tester by following Tappi method T 404 om 87. The resistance of the book paper to repeated folding under load was measured by using the standard MIT fold test. In this test, the sheets of book paper were placed under a 1 kg. load. The sheets of paper were repeatedly folded through opposing 180° angles until they failed. The data in the following table represents the average number of folds which the paper endured prior to tearing. The pH of the book paper was measured by grinding a sample of the book paper and mixing it with 200 ml of deionized water. The pH of the mixture was then measured using a Fisher Accumet Model 630 pH meter calibrated with a buffer at a pH of 4, 7 and 10.

The fold data shown in this table demonstrates that samples containing buffer are effective in preserving book paper. Samples containing a combination of adsorbent and buffer are substantially and unexpectedly more effective at preserving the book paper than those samples containing either of the adsorbent or the buffer alone. The synergistic benefits produced by the combination of the adsorbent and the buffer are substantially greater than what would have been predicted by simply combining the improvements produced by using either the adsorbent or the buffer alone.

The beneficial effects produced by the combination of adsorbent and buffer are particularly surprising because alkaline book paper is generally quite resistant to decomposition. Thus, it would not have been expected that such a substantial reduction in the decomposition of the book paper would have been achieved.

| Paper Sample | % Actv. C | % CaCO$_3$ | Porosity | Tensile | Elongation | MIT Fold 1 Kg. Load | pH T-cold |
|---|---|---|---|---|---|---|---|
| 1 | 20 | 0 | 44 | 7.23 | 3.73 | 4.4 | 7.39 |
| 2 | 0 | 3 | 95 | 6.55 | 3.54 | 4.0 | 7.13 |
| 3 | 0 | 0 | 92 | 7.15 | 3.58 | 3.5 | 7.40 |
| 4 | 0 | 3 | 34 | 7.40 | 3.95 | 4.0 | 7.40 |
| 5 | 20 | 3 | 15 | 7.40 | 3.95 | 7.8 | 7.52 |
| 6 | 0 | 0 | 40 | 5.72 | 3.12 | 2.6 | 7.47 |
| 7 | 15 | 3 | 15 | 7.47 | 3.79 | 6.6 | 7.75 |
| 8 | 10 | 3 | 9 | 7.33 | 3.89 | 5.2 | 7.75 |
| 9 | 5 | 3 | 10 | 6.88 | 3.71 | 5.0 | 7.15 |

It will be apparent to those skilled in the art that various modifications and variations can be made in the present invention without departing from the scope or spirit of the invention. Thus, it is intended that the present invention cover the modifications and variations of this invention provided they come within the scope of the appended claims and their equivalents.

What is claimed is:

1. A method of preserving an archival document or object, comprising storing said archival document or object in sufficient proximity to an archival preservation material to preserve the archival document or object, wherein the preservation material comprises:

an alkaline buffer or a deacidifying agent and an adsorbent contained within a paper material.

2. The method of claim 1, further comprising using said alkaline buffer or deacidifying agent and said adsorbent to form an integral portion of a container in which said archival document or object is stored.

3. The method of claim 1, further comprising storing said preservation material within a container, and also storing said archival document or object within said container.

4. The method of claim 1, wherein said alkaline buffer is selected from calcium carbonate, magnesium bicarbonate, and a mixture thereof.

5. The method of claim 1, wherein said adsorbent is activated carbon or activated charcoal.

* * * * *